US006274050B1

(12) United States Patent
Rasmussen

(10) Patent No.: US 6,274,050 B1
(45) Date of Patent: Aug. 14, 2001

(54) METHOD FOR TREATMENT OF HALOGEN-CONTAINING WASTE MATERIAL

(75) Inventor: Erik Rasmussen, Gentofte (DK)

(73) Assignee: NKT Research Center A/S, Brondby (DK)

( * ) Notice: Subject to any disclaimer, the term of this patent is extended or adjusted under 35 U.S.C. 154(b) by 0 days.

(21) Appl. No.: 09/591,411

(22) Filed: Jun. 12, 2000

Related U.S. Application Data

(62) Division of application No. 08/913,772, filed as application No. PCT/DK96/00117 on Nov. 21, 1997, now Pat. No. 6,124,518.

(30) Foreign Application Priority Data

Mar. 22, 1995 (NO) ........................................ 951096

(51) Int. Cl.[7] ........................................ C02F 1/72
(52) U.S. Cl. ........................ 210/758; 210/761; 210/766
(58) Field of Search ........................ 210/749, 758, 210/761, 766; 423/497, 499.1

(56) References Cited

U.S. PATENT DOCUMENTS

| | | | |
|---|---|---|---|
| 3,826,789 | 7/1974 | Yokokawa | 525/369 |
| 4,303,477 | 12/1981 | Scmidt et al. | 201/2.5 |
| 4,384,923 | 5/1983 | Hillekamp | 201/15 |
| 4,631,183 | * 12/1986 | Lalancette et al. . | |
| 4,711,185 | 12/1987 | Hofmann et al. | 110/215 |
| 5,064,526 | * 11/1991 | Rogers et al. . | |
| 5,093,011 | * 3/1992 | Friedman et al. . | |

FOREIGN PATENT DOCUMENTS

| | | |
|---|---|---|
| 2260393 | 6/1976 | (DE) . |
| 3435622 | 10/1985 | (DE) . |
| 0111081 | 6/1980 | (EP) . |
| 0125383 | 11/1984 | (EP) . |
| 0188718 | 7/1986 | (EP) . |
| 0371239 | 6/1990 | (EP) . |
| 0401810 | 12/1990 | (EP) . |
| 74112979 | 10/1974 | (JP) . |
| 74916049 | 8/1975 | (JP) . |
| 409276690A | * 10/1997 | (JP) . |
| 9118960 | 12/1991 | (WO) . |

OTHER PUBLICATIONS

Laid–Open Patent Gazette of JP 74–112979 of Oct. 28, 1974.

Laid–Open Patent Gazette of JP 74–16049 of Aug. 29, 1975.

English Abstract of WO 9118960 dated Dec. 12, 1991.

Skoog et al., Fundamentals of Analytical Chemistry, 2nd Ed., Holt Rinehart and Winston, (1969), pp. 103& 146.

* cited by examiner

*Primary Examiner*—David A. Simmons
*Assistant Examiner*—Betsey Morrison Hoey
(74) *Attorney, Agent, or Firm*—Ladas & Parry

(57) ABSTRACT

A method for treatment of halogen-containing waste material, in particular PVC-containing waste material, is disclosed. The waste material is heated in a decomposition step in a reaction zone in a substantially closed system essentially without addition of water to a temperature between 150 and 750° C., preferably 250–350° C., in the presence of a halogen-reactive compound selected from alkali and alkaline earth metal hydroxides, alkali and alkaline earth metal carbonates and mixtures thereof, so as to establish a controllable autogenous pressure substantially above atmospheric pressure, in a sufficient reaction time to convert essentially all halogen present in the waste material to alkali or alkaline earth metal halides. The closed system preferably also has a condensation zone, where water vapor and volatile compounds liberated from the waste material are condensed. Remanence obtained in the decomposition step is washed with an aqueous solvent, preferably pure water, and the soluble and insoluble parts of the remanence are separated. By this method the halogen is removed from the waste without uncontrolled emission of halogen-containing acids to the environment.

10 Claims, 4 Drawing Sheets

METHOD FOR TREATMENT OF HALOGEN-CONTAINING WASTE MATERIAL

This application is a divisional application application Ser. No. 08/913,772 filed on Nov. 21, 1997, now U.S. Pat. No. 6,124,518, Nov. 26, 2000, which is International Application PCT/DK96/00117 filed on Mar. 22, 1996 and which designated the U.S. claims the benefit thereof and incorporates the same by reference.

BACKGROUND OF THE INVENTION

The present invention relates to a method for treatment of halogen-containing waste material.

The disposal of halogen-containing waste material, such as waste material containing PVC (polyvinylchloride) and/or other halogen-containing polymers, causes pollution problems, particularly because the combustion of such halogenated organic materials usually results in the release of the halogen atoms in the form of noxious products. For example in the case of chlorinated organics, HCl may be released, which, because of its corrosive nature, is a serious source of environmental pollution.

A large number of methods for treatment of such waste materials are known, such as catalytic cracking methods, hydrogenation cracking methods and pyrolysis methods. The cracking methods as such suffer from the drawback that they can only be used for treating materials having low contents of halogen-containing polymer materials. Further, the cracking method is very expensive, and large acid resistant plants are needed for carrying out the method.

Pyrolysis methods are in general more flexible and can be used for treatment of most waste materials.

EP-A1-0 125 383 discloses a method for decomposition of organic waste material containing halogen by treatment of the waste material in a molten salt pool comprising a mixture of basic alkaline earth metal compound and an alkaline earth metal halide. An oxygen-containing gas is introduced into the pool containing the waste to produce a gaseous combustion product and to cause the halogen present in the waste to react with the basic alkaline earth metal compound to produce additional alkaline earth metal halide.

It is essential that the salt pool is kept in a molten state and the alkaline earth metal is kept in a dissolved state. This means that high temperatures are needed. Further, a large amount of alkaline earth metal is used.

EP-B1-0 111 081 and DE-C1-3 435 622 disclose pyrolysis methods for treatment of halogen-containing waste materials, wherein the waste materials are slowly annealed in a rotating oven at a temperature between 300 and 600° C. Basic compounds, such as $CaCO_3$ and $Ca(OH)_2$ are added to the waste materials before or after the annealing process in order to neutralize the acids produced in the annealing process. The methods, however, only remove a part of the acids produced, and large amounts of gaseous acids, such as HCl are still emitted to the environment.

WO 91/18960 discloses a method for treatment of PVC waste material, wherein the PVC is subjected to a temperature of between 150 and 300° C., until all halogens are emitted as HCl. The HCl is then collected for reuse. Because of the highly corrosive HCl, this method needs special equipment and is not economically profitable.

Another method for removing the halogen from halogen-containing polymer compounds, which is disclosed in a number of publications of Japanese origin, is based on a treatment of the halogen-containing polymer in an aqueous medium, typically basic solution of alkaline earth metal hydroxide or soil, at an elevated temperature of 160–300° C.

Thus JP-A-74-112979 discloses a process for removing the halogen contained in a polyhalogen polymer, comprising the steps of dispersing a polyhalogen polymer into an aqueous medium containing one or more selected from alkali metal hydroxides, alkaline earth metal hydroxides, salts of alkali or alkaline earth metals, iron and its compounds, zinc and its compounds, aluminum and its compounds, and sulfur, heating the mixture in the presence of an inactive gas or oxygen under pressurization, for removing the halogen or hydrogen halide.

It is stated that the known treatments for removing the halogen or hydrogen halide from polyhalogen polymers performed in a vapour phase in a nitrogen or oxygen atmosphere is difficult to control, if a recovery of halogen-free polymer is the object, and this problem is alleged to be solved by the proposed hot water treatment.

A very similar process is proposed in JP-A-74-16049, where PVC is heated at 160–300° C. in basic aqueous solutions containing alkali and/or alkaline earth metal hydroxides and optionally catalytic amounts of organic amines.

In a very similar earlier proposal by the same applicant, viz. DE 22 60 393 B2 a process for dehydrohalogenation of PVC is disclosed, wherein PVC is heated in an aqueous solution of an alkaline inorganic material selected from ammonia, alkali or alkaline earth metal hydroxides and optionally a catalytic amount of an ammonium salt and/or ammonia at 180–300° C.

The reaction is carried out by adding PVC to a hot alkaline aqueous solution and treating the medium at 180–300° C. This temperature is critical for the quality of the dehalogenated end product. In order to avoid evaporation of the aqueous medium an elevated pressure is used which depends on the dissolved inorganic material.

The desadvantage of the processes based on the treatment in an aqueous medium is related to the evaporation of the water at the high reaction temperature which either has to be countered by addition of an active gas or oxygen or results in elevated pressures which are difficult to control.

Also the high amounts of water which are used according to the above-mentioned citations requires a substantial reactor volume in comparison with the volume of the treated waste material.

SUMMARY OF THE INVENTION

The object of the present invention is to provide an improved method for treatment of halogen-containing waste material, which method is simple and less expensive than known methods.

A second object of the invention is to provide a method for treatment of halogen-containing waste material, by use of which method substantially all halogen atoms are removed from the waste material without causing uncontrolled emission to the environment and preferably with highly reduced or eliminated emission of gaseous halogen containing acids to the environment.

This object is achieved by the method according to the invention, wherein the waste material is heated in a reaction zone in a substantially closed system essentially without addition of water to a temperature between 150 and 750° C. in the presence of a halogen-reactive compound selected from alkali and alkaline earth metal hydroxides, alkali and alkaline earth metal carbonates and mixtures thereof, so as to establish a controllable autogenous pressure substantially above atmospheric pressure, in a sufficient reaction time to convert essentially all halogen present in the waste material to alkali or alkaline earth metal halides.

As mentioned the method is carried out “essentially without addition of water”. This expression which distinguishes the invention from the prior art cited above takes into account that some of the waste material might be wet and also that the halogen-reactive compound might be introduced as a pumpable slurry as further explained below.

As mentioned before, it has been known for long to use halogen-reactive compounds such as alkali and alkaline earth metal hydroxides and alkali and alkaline earth metal carbonates to neutralize halogen-containing acids emitted when halogen-containing waste material is decomposed, e.g. by in particular HCL pyrolysis. However, it has never been known or hinted at that the reaction pressure could have any influence on the reactivity and the neutralizing effect.

It is therefore very surprising that by using the method according to the present invention for treatment of halogen-containing waste material, it is possible in a simple manner to remove substantially all halogen atoms in the form of halogen salts and thereby avoid emission of halogen acids to the environment.

The method can be used for decomposing almost any kind of halogen-containing waste material, such as PVC-containing material and other halogen polymer-containing materials.

DETAILED DESCRIPTION OF THE INVENTION

The temperature of the decomposition step is preferably between 250 and 350° C. The decomposing of halogen initiates at about 150° C., but the reaction is rather slow at that temperature. On the other hand, temperatures above 350° C. do not increase the reaction rate substantially.

The pressure at the decomposition step is preferably above 2 bars and most preferably above 5 bars. Best results are obtained with pressures in the range from 10 to 75 bars.

The optimal time of treatment in the decomposition step is very much dependent on what kind of material is treated, how much material, and the temperature/pressure and actual equipment used, as well as the overall heat transmission conditions. As further explained below the reaction time should be sufficient to secure a conversion of essentially all the halogen present in the waste to alkali or alkaline earth metal halides.

In all cases 24 hours of treatment suffice to completely decompose the halogen atoms from the waste material. In most cases 4–16 hours of treatment is optimum, but less time may be sufficient.

The choice of the halogen-reactive compound is normally price-dependent. But as will be described later on, the different reaction products obtained with different halogen-reactive compounds may also influence the choice of this halogen-reactive compound.

The halogen-reactive compound may be present partly or fully inherently in the waste material, i.e. in the form of chalk, dolomite or polymer compounds containing such halogen-reactive compounds as filler. Normally, it will be necessary to at least add a part of the halogen-reactive compound.

The halogen-reactive compound may be added in the form of solid blocks, granulate, powder or in any other form. It is most preferred to add the halogen-reactive compound in the form of powder or granulates. If it is desirable to introduce the halogen-reactive compound in pumpable form an aqueous slurry might be used.

It is not critical how the halogen-reactive compound is added to the waste. It may be placed as a layer on top of the waste material, it may be slightly mixed by use of a stirring means or in a rotating reactor, or it may be compounded into the waste material.

The waste material may be comminuted or granulated, but this is not necessary for the method according to the invention. If the waste material is comminuted, it may take up less space, and the capacity of an apparatus for carrying out the method of the invention may be increased.

Normally it is possible to estimate the amount of halogen atoms in a specific kind of waste material. It may be useful to test a small sample for its halogen content.

This can be done on laboratory scale by use of ordinary test methods such as pyrolysis.

The content of halogen-reactive compounds in the waste material may also be estimated or tested, but in practice it is less relevant, because the amount is normally small and surplus of halogen-reactive compounds does not have any harmful influence on the method, nor on the environment. However, if large amounts of halogen-reactive compounds are present in the waste material, which can be the case for PVC compounds used in the production of electrical cables, it may be useful to include these amounts in the calculation, since the addition of halogen-reactive compounds may then be reduced proportionally to the amounts inherently present in the waste material.

The amount of halogen-reactive compounds added is preferably between 0.5 and 4, and most preferably 1–2 times the stoichiometrical amount of halogen atoms in the waste material, or the total amount of the halogen-reactive compound or compounds either added or inherently present in the waste material is preferably between 0.5 and 4, preferably 1–2 times the stoichiometrical amount of halogen atoms in the waste material.

The suitable amount may be established by determination of the halogen-content in the polymer materials as exemplified below for chlorine.

The halogen-reactive compound is preferably added before the decomposition step, but it may also be added continuously or discontinuously in two or more steps before and during the decomposition step, or only during the decomposition step.

In the following “AK” represents an alkaline metal ion, “AE” represents an alkaline earth metal ion and “HA”represents a halogen ion.

The reaction follows the following reaction schemes:

| | | | | | | |
|---|---|---|---|---|---|---|
| $AK_2CO_3$ | + 2 HHA | → 2 AKHA(s) | + $H_2O$(g) | + $CO_2$(g) | R1 |
| $AKHCO_3$ | + HHA | → AKHA(s) | + $H_2O$(g) | + $CO_2$(g) | R2 |
| AKOH | + HHA | → AKHA(s) | + $H_2O$(g) | | R3 |
| $AECO_3$ | + 2 HHA | → $AEHA_2$(s) | + $H_2O$(g) | + $CO_2$(g) | R4 |
| $AE(OH)_2$ | + 2 HHA | → $AEHA_2$(s) | + $H_2O$(g) | | R5 |

According to the invention the water formed during the reaction and volatile compounds liberated from the waste material are preferably withdrawn from the reaction zone and condensed in a separate condensation zone.

This makes it possible to increase the useful reactor volume and facilitate the control of the autogenous pressure built up during the reaction.

If lead compounds are present in the waste material, lead ions may react with the halogen acid to give $PbHA_2$, e.g. if the lead is present as $PbCO_3$, it may react according to the following reaction scheme:

$$(PbCO_3)_2Pb(OH)_2+6HHA \rightarrow 3PbHA_2(s)+2CO_2(g)+4H_2O(g) \quad R6$$

Whether or not the lead compounds will react with the halogen-containing acids depends primarily on the amount and the type of other halogen-reactive compounds present, the reaction temperature, the reaction time and the reaction pressure.

If the lead compound/halogen-containing acid reaction is desired, the temperature should preferably be above 250° C., the halogen-reactive compounds should preferably be carbonates or hydroxides, the pressure should be according to the present invention, and the reaction time should be more than 4 hours, preferably more than 12 hours.

The inorganic reaction product may be leached from the ash and reused, e.g. if AE is Ca, the $CaCl_2$ may be reused as a precipitant for phosphor in waste water or road salt.

The waste material used in the following examples is a PVC-containing waste material from cables consisting of PVC, plasticizers, chalk, stabilizers and small amounts of pigments, etc. On an average basis the following composition is obtained (w/w):

| | |
|---|---|
| PVC: | 43.9% |
| Plasticizer: | 24.5% |
| Chalk: | 30.0% |
| Stabilizer: | 1.0% |
| Other materials: | 0.6% |

The PVC comprises approximately 58% by weight chlorine, i.e. the halogen or chlorine part of the waste material is about 25.5% by weight.

The stabilizer is an alkaline lead carbonate compound $(PbCO_3)_2$ $Pb(OH)_2$.

DETERMINATION OF CHLORINE IN POLYMER MATERIALS

Figure 1:
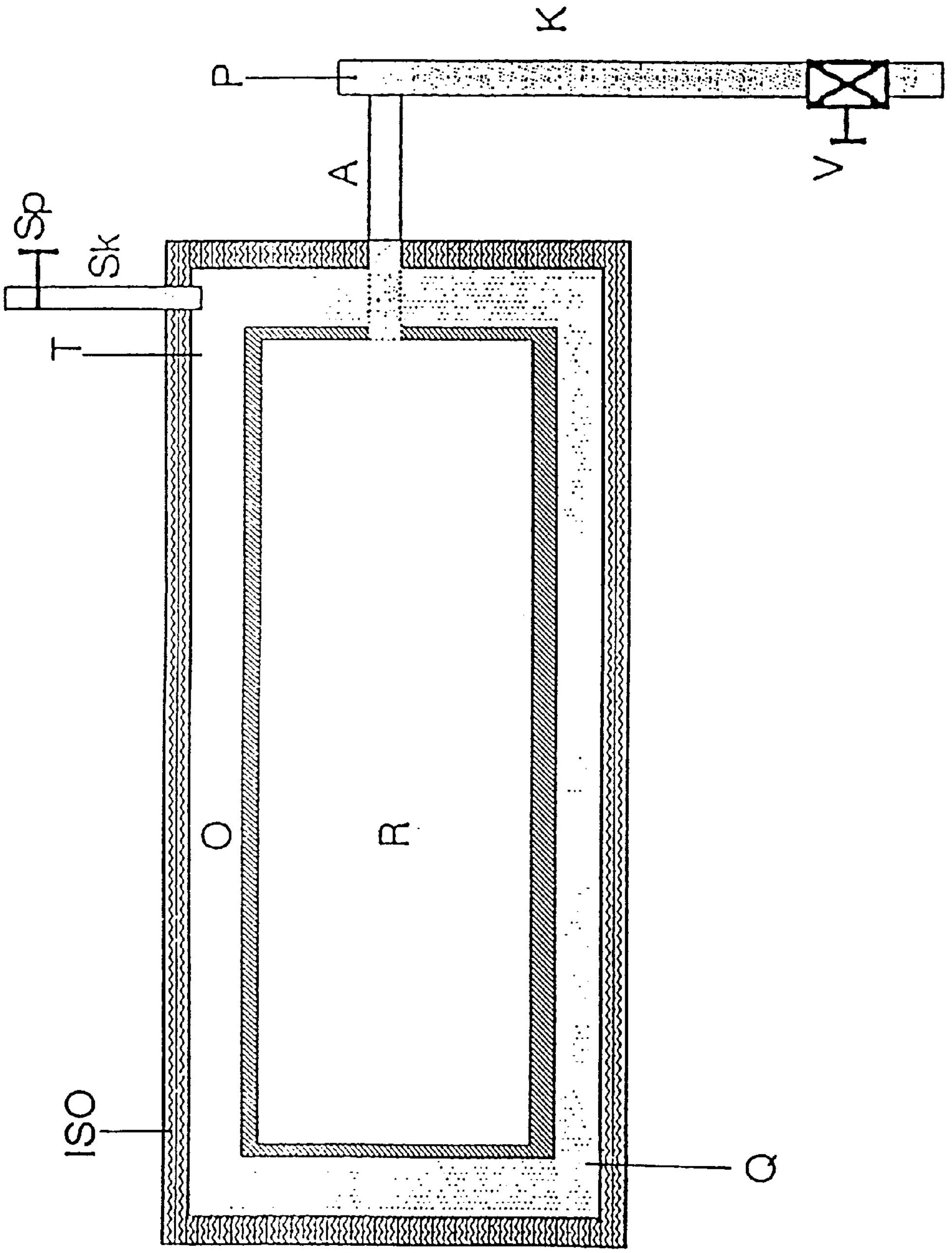
FIG. 1 is a sketch of the reactor used in the following examples.

If desired, the amount of halogen-reactive compounds may be determined following determination of halogen in the waste materials in.the following way:

2×4 g polymer material are weighed on precision balance with a degree of accuracy of 0.1 mg and Soxhlet ether extracted for approx. 16 hours.

The ether extract is evaporated and weighed on precision balance.

0.1 g ether extract is weighed on precision balance with a degree of accuracy of 0.1 mg down into a Kjeldahl flask and added with 20 ml concentrated $H_2SO_4$ and 5 ml concentrated $HNO_3$. The Kjeldahl flask is heated from approx. 150° C. to 275° C. in a Woods metal bath in 2 hours.

The temperature is maintained constant for 14 hours.

The gas generated is collected quantitatively (over 16 hours) in a Friedrich washing flask containing 25.00 ml $AgNO_3$, 5 ml concentrated $HNO_3$, and 30 ml demineralized water. The content of the washing flask is filtered on glass filter hopper prior to titration according to Volhard to faintly reddish brown end point.

Calculation is made as % Cl from polymer in original sample=Cl from % extract/100=% Cl from polymer.

Alternatively, extraction can be performed on a Soxtec apparatus for 50 min.

Hereafter determination of chlorine is performed on an Euroglas Coulometric System ESC 2000.

The method has a relative uncertainty of 10%.

EXAMPLE 1 (reference example)

From the waste material 4 different test materials were prepared.

AO was the waste material without addition. The materials nos. 3, 6 and 7 were prepared by adding a halogen-reactive compound according to the following scheme:

| | |
|---|---|
| Material no. 3: | PVC ref. + 5.75% (w/w) $CaCO_3$ |
| Material no. 6: | PVC ref. + 4.00% (w/w) $Ca(OH)_2$ |
| Material no. 7: | PVC ref. + 5.98% (w/w) $Ca(OH)_2$ |

Samples 3, 6 and 7 were mixed in a Brabrander kneading machine to homogenity, i.e. the added salts and the PVC waste material are compounded.

All test materials were granulated (approximately to 6 mm granulates).

Two samples of 25 g of each test material were treated in an open crucible placed in an oven at 350° C. and 320° C., respectively. The time of treatment was 16 hours. The weight of the coke residuals was measured, and the weight of the degassed material was calculated. The residuals were washed with water, and the soluble salts $CaCl_2$ and $PbCl_2$ were leached, and the amount of leached product was dried in an oven at 105° C. and measured by weighing. The washing-out was controlled by measuring the conductivity in the leached product. The conductivity results primarily from the chlorine ions, and the leaching was continued until a portion of washing water (leaching) had a conductivity being slightly higher or equal to the conductivity of "unused" washing water.

The results are shown in Table 1.

TABLE 1

| Sample No. | Oven temperature | Coke residuals %*) | Leaching of coke residuals %*) | Leaching of starting material %*) | Degassing %*) | Pb (ppm) |
|---|---|---|---|---|---|---|
| 0A | 350 | 43.2 | 31.2 | 13.48 | 56.8 | — |
| 3 | 350 | 41.5 | 30.7 | 12.74 | 58.5 | — |

TABLE 1-continued

| Sample No. | Oven temperature | Coke residuals %*) | Leaching of coke residuals %*) | Leaching of starting material %*) | Degassing %*) | Pb (ppm) |
|---|---|---|---|---|---|---|
| 6 | 350 | 44.9 | 35.6 | 15.98 | 55.1 | — |
| 7 | 350 | 47.7 | 32.2 | 15.36 | 52.3 | — |
| 0A | 320 | 47.9 | 31.1 | 14.90 | 52.1 | 1542 |
| 3 | 320 | 48.4 | 32.5 | 15.73 | 51.6 | 810 |
| 6 | 320 | 51.9 | 31.9 | 16.56 | 48.1 | 600 |
| 7 | 320 | 52.2 | 34.8 | 18.17 | 47.8 | 330 |

*)All percentages are percent by weight.

EXAMPLE 2 (reference example)

16 samples of 25 g of the cable waste material were tested. Each sample was granulated and placed in a crucible covered by a loose-fitting ceramic lid. A stoichiometrical amount of chalk in the form of powder was either mixed into the samples (not compounded) or placed as a layer on the samples. The time of treatment was chosen to be 16 or 8 hours. The temperature was either 280° C. or 300° C.

The percent by weight of coke residuals, degassed product, leached product from the residuals in percent by weight of the coke residuals and the total product, respectively, as well as the Pb concentration in the leached product were calculated. The reaction degree was determined by using the formula:

$$\frac{\text{weight of } H_1}{\text{weight of } H_0} \times \frac{\text{molar weight of } H_0}{\text{molar weight of } H_1} = \text{reaction degree}$$

wherein $H_o$ denotes a halogen-reactive compound added to the waste material plus the inherent halogen-reactive compound in the waste material (an estimate), and $H_1$ denotes the halogen-containing reaction products. The test conditions and the test results are shown in Table 2.

Q denotes a source of heat which, in this example, is hot air circulated by a hot air blower, R denotes reaction chamber or pressure room, O denotes an intermediate hood A denotes an exhaust pipe K denotes a condenser, V denotes a valve T denotes a temperature recorder P denotes a pressure recorder ISO denotes an insulation Sp denotes a damper Sk denotes a “chimney” for air 13 samples were tested. The samples were prepared from the cable waste material (samples HP 1–4 and 7–13) or waste material from a pipe of rigid PVC (sample HP5) and a pipe of plasticized PVC (sample HP6), which had been granulated to about 6–20 mm grain size, whereto the approximate stoichiometrical amount of halogen-reactive compounds had been added in the form of powder. The stoichiometrical amount was calculated on the basis of the reaction scheme R1, R2, R3, R4, R5 and/or R6.

The test was carried out as follows:

Treatment:

Approximately 20 g of the sample and the stoichiometrical amount of halogen-reactive compound were mixed in a

TABLE 2

| Sample No. | Added chalk | Granulation size | Temperature/ Time ° C./hours | Degassing %*) | Coke residual %*) | Leached product-%*) of coke residuals | Leached product-%*) of starting material | Pb (ppm) | Reaction degree |
|---|---|---|---|---|---|---|---|---|---|
| 12 | (−)/$CaCO_3$ | >4 mm | 300/16 | 51.5 | 48.5 | 27.6 | 13.39 | 5816 | 40.20 |
| 13 | (−)/$CaCO_3$ | <1 mm | 300/16 | 52.9 | 47.1 | 30.3 | 14.27 | 5374 | 42.86 |
| 14 | (+)/$CaCO_3$ | >4 mm | 300/16 | 44.5 | 55.5 | 23.6 | 13.10 | 5617 | 32.44 |
| 15 | (−)/$CaCO_3$ | <1 mm | 300/16 | 48.8 | 51.2 | 27.0 | 13.82 | 5572 | 34.25 |
| 16 | (+)/$Ca(OH)_2$ | >4 mm | 300/16 | 43.1 | 56.9 | 33.3 | 18.95 | 281 | 49.29 |
| 17 | (−)/$Ca(OH)_2$ | <1 mm | 300/16 | 44.0 | 56.0 | 36.5 | 20.44 | 705 | 53.25 |
| 18 | (+)/$CaCO_3$ | >4 mm | 280/16 | 41.6 | 58.4 | 25.3 | 14.78 | 4680 | 36.61 |
| 19 | (−)/$CaCO_3$ | <1 mm | 280/16 | 45.5 | 54.5 | 26.9 | 14.66 | 4917 | 36.32 |
| 20 | (+)/$Ca(OH)_2$ | >4 mm | 280/16 | 42.0 | 58.0 | 32.0 | 18.56 | 138 | 48.35 |
| 21 | (−)/$Ca(OH)_2$ | <1 mm | 280/16 | 44.6 | 55.4 | 34.1 | 18.89 | 1197 | 49.22 |
| 22 | (−)/$CaCO_3$ | >4 mm | 300/8 | 42.2 | 57.8 | 24.6 | 14.22 | 2670 | 42.70 |
| 23 | (−)/$Ca(OH)_2$ | <1 mm | 300/8 | 41.6 | 58.4 | 30.4 | 17.75 | 524 | 53.31 |
| 24 | (−)/$CaCO_3$ | >4 mm | 300/8 | 47.1 | 52.9 | 24.6 | 13.01 | 2590 | 32.24 |
| 25 | (−)/$Ca(OH)_2$ | <1 mm | 300/8 | 44.2 | 55.8 | 33.0 | 18.41 | 397 | 47.97 |
| 26 | (+)/$CaCO_3$ | >4 mm | 280/8 | 41.4 | 58.6 | 23.5 | 13.77 | 1343 | 34.12 |
| 27 | (+)/$Ca(OH)_2$ | <1 mm | 280/8 | 41.9 | 58.1 | 31.1 | 18.07 | 3277 | 47.08 |

*)All percentages are percent by weight
(−) Chalk mixed into sample
(+) Chalk placed as a layer on sample.

EXAMPLE 3 (according to the invention)

In this example a closed reactor was used. The reactor is sketched on FIG. 1, where 150 ml beaker and transferred by means of a funnel to the pressure chamber (degree of filling about 90%). The pressure chamber was closed with 8 mm bolts (greased with screw paste "Molykote"). A new packing was introduced (white teflon packing) before closing the reaction chamber. The pressure chamber was placed in the "hot-air" oven and the oven lid was closed. The thermostat of the hot air blower, a Bosh PHG 630-2 LCE, was adjusted to 7 and the exhaust positioned in position II. The temperature recorder and the blower were started. Time, temperature and pressure were registered every 15 minutes, until the pressure started to rise (>2 bars and temperature >220° C.). Subsequently, time, temperature and pressure were registered every 5 minutes, until the desired maximum pressure was reached. Time, temperature and pressure were then registered every half hour. After finishing the test the final temperature, pressure and time were registered. The valve after the condenser was carefully opened to allow the liquid and gas phase to flow via a tube to the liquid and gas collector apparatus. The gas phase was checked for halogen ions by leading the gas phase through a solution of $AgNO_3$. The liquid was collected in a vial and saved for analysis. The coke residuals are weighed immediately after the removal from the pressure chamber (as the ash is very water absorbing).

Leaching:

The ash was crushed in a porcelain mortar and quantitatively poured into a 500 ml conical flask together with 400 ml of distilled water. It was stirred for approximately 3 hours (magnetic stirrer). The solution was filtered (paper filter) into a bowel. The filter cake was subsequently washed with 2×50 ml of distilled water. The leached product and the filter/filter cake were dried at 105° C. The leached product and the coke residuals were determined (weighed) after the leaching.

Calcined Residue:

The dried leached coke residual was introduced into a crucible which was annealed at 600° C. for 24 hours. The calcined residue was determined (weighed).

Determination of Pb concentration in the leached product and the calcined residue:

Leached Product:

Approximately 1 g of leached product was mixed with 10 ml of 65% $HNO_3$ and 10 ml of distilled water and heated (until dissolved). It was then diluted to 100 ml with distilled water.

Calcined Residue:

Approximately 1 g of calcined residue was mixed with 10 ml of 65% $HNO_3$ and together with about 10 ml of distilled water transferred from the crucible to a 100 ml flask. It was then heated in the flask (possibility of insoluble compounds, rust-red precipitate). Subsequently, it was filtered and diluted to 100 ml with distilled water.

The Pb concentration was measured by use of an atomic absorption spectrophotometry (Perkin Elmer model 1000 AAS).

The test conditions and the test results are shown in Tables 3 and 4.

TABLE 3

| Sample No. | Weight g | Temp./time ° C./hours | Base/Added g | Degassing % | Coke residuals % | Pressure maximum | HCl in gas phase | Leached product-% of coke residuals | Leached product-% of starting material | Reaction degree |
|---|---|---|---|---|---|---|---|---|---|---|
| HP1 | 25.53 | 290/12 | $CaCO_3$/5.0 | 23.1 | 76.9 | 60.0 bars | n.d. | 53.5 | 41.14 | 89.39 |
| HP2 | 20.32 | 290/12 | $CaCO_3$/2.01 | 27.0 | 73.0 | 63.0 bars | n.d. | 60.2 | 43.95 | 109.06 |
| HP3 | 20.00 | 290/12 | $Ca(OH)_2$/1.48 | 21.7 | 78.3 | 60.5 bars | n.d. | 60.5 | 47.37 | 122.80 |
| HP4 | 20.00 | 290/12 | $CaCO_3$/1.80 | 23.5 | 76.5 | 68.0 bars | n.d. | 54.9 | 42.00 | 106.00 |
| HP5 | 10.00 | 290/12 | $CaCO_3$/7.80 | 23.2 | 76.8 | 58.0 bars | n.d. | 51.5 | 39.55 | 81.32 |
| HP6 | 20.00 | 290/12 | $CaCO_3$/9.80 | 28.4 | 71.6 | 77.0 bars | n.d. | 58.0 | 41.53 | 113.76 |
| HP7 | 20.00 | 290/8 | $Ca(OH)_2$/1.48 | 32.4 | 67.6 | 32.0 bars | n.d. | 61.0 | 41.24 | 106.90 |
| HP8 | 20.00 | 290/4 | $Ca(OH)_2$/1.48 | 26.8 | 73.2 | 32.0 bars | n.d. | 59.3 | 43.41 | 112.53 |
| HP9 | 20.00 | 290/8 | $CaCO_3$/1.80 | 31.7 | 68.3 | 37.5 bars | n.d. | 59.3 | 40.50 | 101.98 |
| HP10 | 20.00 | 290/4 | $CaCO_3$/1.80 | 27.0 | 73.0 | 37.0 bars | n.d. | 57.2 | 41.76 | 105.14 |
| HP11 | 20.00 | 290/8 | $Na_2CO_3$/1.91 | 31.0 | 69.0 | 38.0 bars | n.d. | 58.0 | 40.02 | 100.87 |
| HP12 | 20.00 | 290/8 | $Na_2CO_3$/3.00 | 38.9 | 61.1 | 39.0 bars | n.d. | 57.6 | 35.19 | 91.00 |
| HP13 | 20.00 | 290/100 | $Ca(OH)_2$/1.48 | 27.9 | 72.1 | 31.5 | n.d. | 56.4 | 40.64 | 105.42 |

n.d. = not detected
all percentages in % by weight

TABLE 4

| Sample No. | Calcined residual g | Pb (calcined residual) mg/kg | Pb (leached product) mg | % lead in leaching in % of total lead in starting material | Calcined residue in % of starting material + added halogen-reactive compound/mg |
|---|---|---|---|---|---|
| HP1 | 2.640 | i.b. | 3821 | i.b. | 8.65 |
| HP2 | 0.775 | 82958 | 14643 | 68 | 3.45 |
| HP3 | 1.041 | 5035 | 8476 | 94 | 4.84 |
| HP4 | 1.179 | 22781 | 9789 | 75 | 5.41 |
| HP5 | 1.437 | 888 | 46 | *1* | 8.09 |
| HP6 | 1.105 | 246 | 53 | *2* | 3.69 |
| HP7 | 0.612 | 147736 | 5917 | 36 | 2.89 |
| HP8 | 0.650 | 178220 | 2266 | 15 | 3.03 |
| HP9 | 0.600 | 158085 | 3419 | 23 | 2.75 |
| HP10 | 0.723 | 111343 | 3099 | 24 | 3.30 |
| HP11 | 0.780 | 118145 | 8255 | 43 | 3.55 |

TABLE 4-continued

| Sample No. | Calcined residual g | Pb (calcined residual) mg/kg | Pb (leached product) mg | % lead in leaching in % of total lead in starting material | Calcined residue in % of starting material + added halogen-reactive compound/mg |
|---|---|---|---|---|---|
| HP12 | 0.880 | 98148 | 8220 | 45 | 3.69 |
| HP13 | 1.460 | 112547 | 2084 | 10 | 6.73 |

*1*"free of lead": (total lead in calcined residue and leached product = 1.58 mg)
*2*"free of lead": (total lead in calcined residue and leached product = 0.88 mg)

Figure 2:
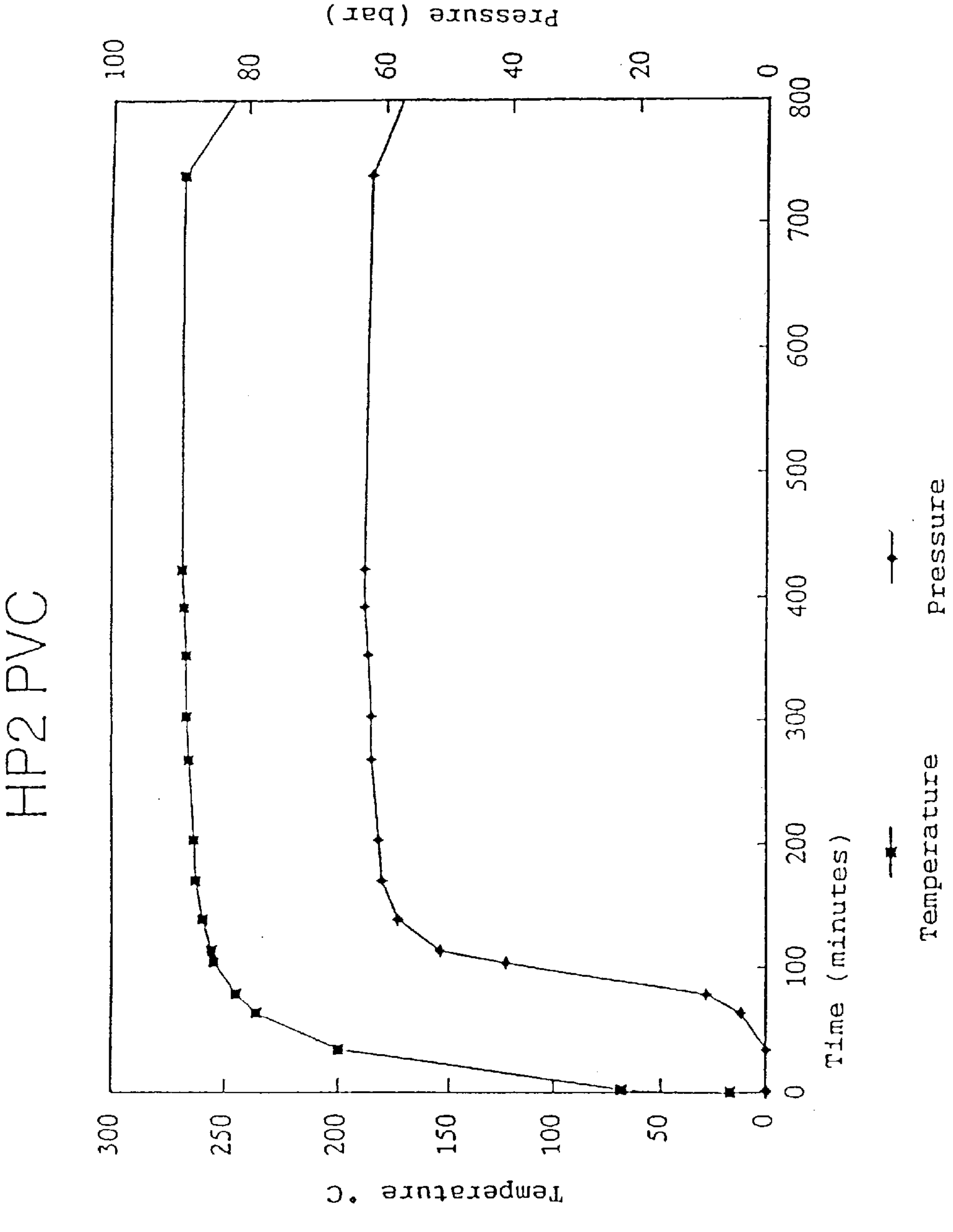
FIGS. 2, 3 and 4 show pressure/temperatures of some of the tests in example 3.
Figure 3:
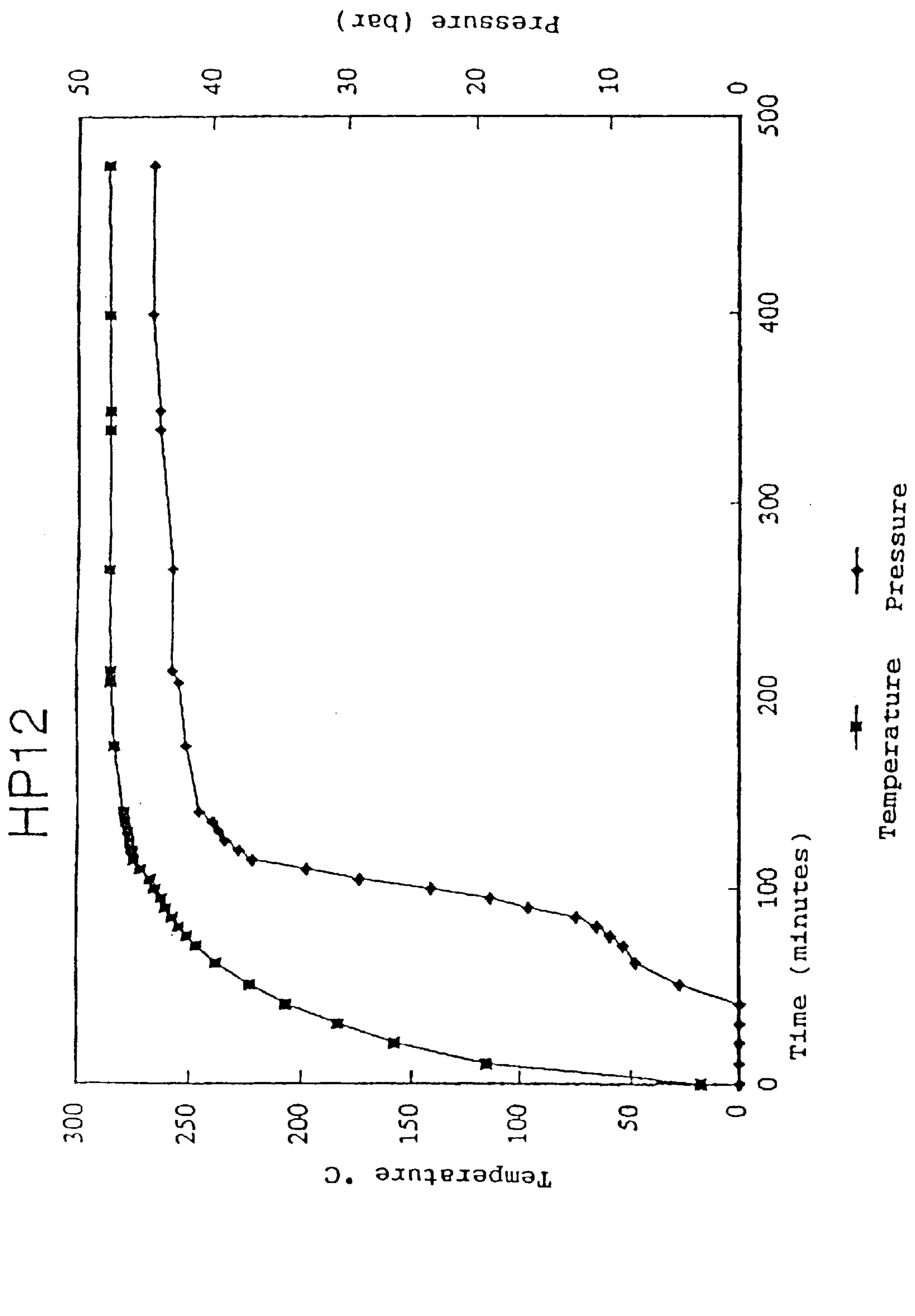
Figure 4:
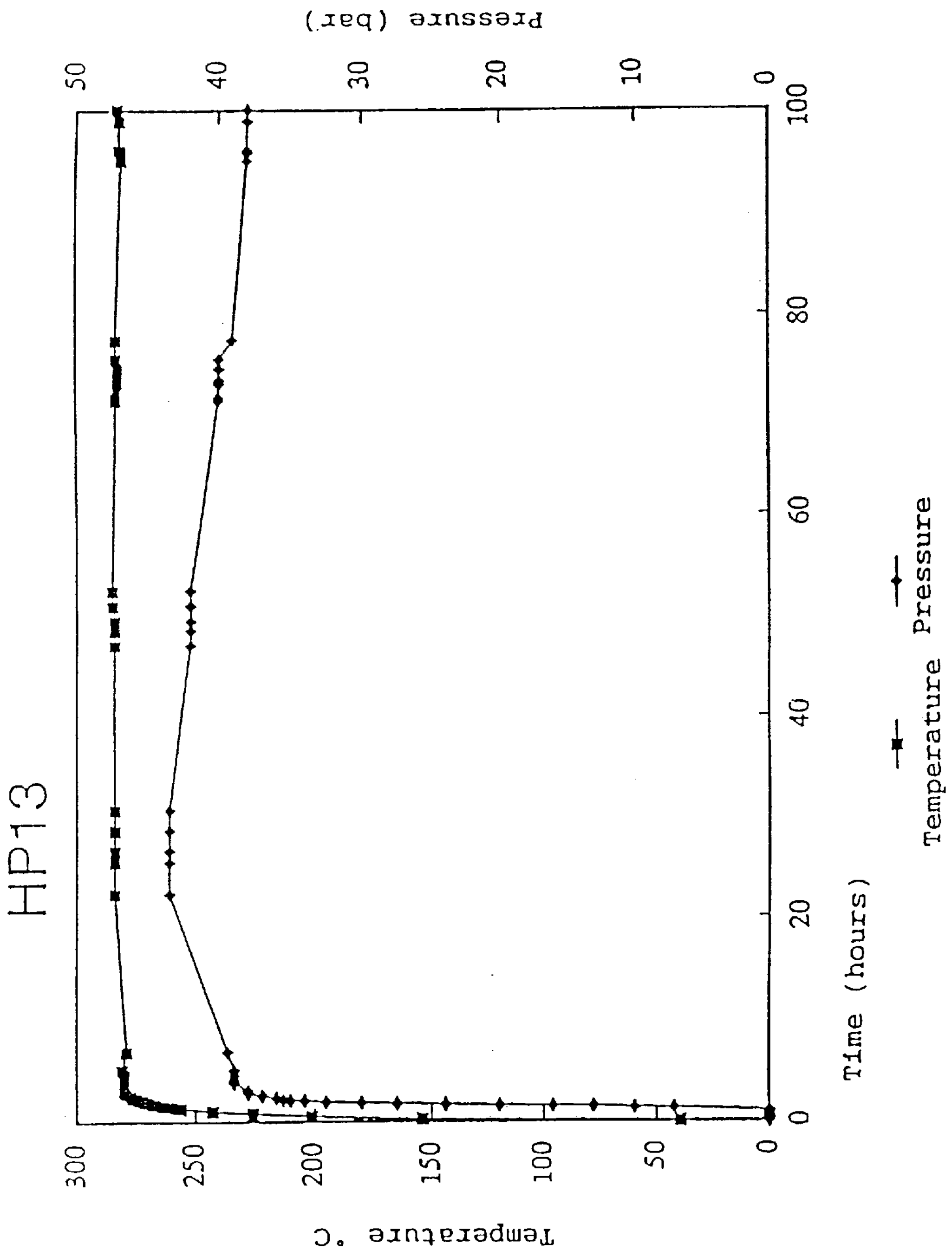

The pressure/temperature curve for test sample HP2 and HP12 and HP13, respectively, is drawn up in FIGS. 2, 3 and 4.

The degassed product was examined, and it consisted primarily of $N_2$ and $CO_2$ (the gas phase) and plasticizer and water (the condensed phases).

It can be seen from the results that by using the method according to the invention it is possible to carry out reactions R1–R6 practically quantitatively. This appears i.a. from the fact that the amount of halogen products is typically 40–44% by weight (leached product of total).

If this is compared with the theoretically calculated maximum amount of product it can be concluded that the reactions can be carried out approximately 100% with virtually stoichiometrical quantities having added extra halogen-reactive compounds.

The reaction degree in sample no. HP1 being less than 100% is due to a leakage which occurred at the pressure gauge during the test. The reaction degree in test HP5 being a little less than 100% is due to calcium carbonate overdosage because of an unknown composition of the PVC waste material.

It can be seen that the calcined residue only constitutes approximately 3% by weight of the original quantity of waste material. This shows that reactions R1–R6 are virtually carried out 100%. This should be compared with the fact that the amount of ash by known decomposition methods, such as incineration methods, typically constitutes 35%–40% by weight.

When decomposing the non-chlorine containing leached coke residual the final amount of ash for end deposition can be reduced by 90–95% by use of the method according to the invention. This is much more than by using ordinary decomposition methods.

What is claimed is:

1. A method of treating a halogen-containing waste material with a halogen reactive material selected from the group consisting of alkali and alkaline earth metal hydroxides, alkali and alkaline earth metal carbonates and mixtures thereof; said method comprises the steps of a) adding the halogen reactive material to the halogen containing waste material, the total amount of added halogen reactive material and halogen reactive material inherently present in the waste material being between 0.5 and 1 times the stoichiometrical amount of halogen atoms in the waste material, b) heating the waste material and halogen reactive material in a pressure reactor means essentially without addition of water at a temperature within the range between 150° and 750° C. that is sufficient to generate a pressure above 2 bars, said pressure reactor means comprising means for releasing volatile compounds liberated from the waste material so as to control pressure build-up in the reactor means, said reactor means being otherwise closed; and c) maintaining the pressure reactor means for a sufficient time to convert halogen in the waste material to alkali or alkaline earth metal halides, whereby substantially all halogen possible are reacted to alkali or alkaline earth metal halides.

2. A method of treating a halogen-containing waste material according to claim 1, further comprising adding water in step a), the amount of water added being sufficiently low so as not to affect the reaction in steps b) and c).

3. A method of treating a halogen-containing waste material according to claim 1, wherein the waste material is wet prior to the reaction between the waste material and the halogen reactive material.

4. A method of treating a halogen-containing waste material according to claim 1, wherein the halogen reactive material added in step a) is in the form of an aqueous slurry.

5. A method of treating a halogen-containing waste material according to claim 1, wherein the halogen containing waste material and the halogen reactive material are present in the reactor means in respective forms and amounts that cause them to undergo a reaction with one another that consists essentially of at least one reaction scheme selected from the group consisting of R1, R2, R3, R4, R5, and R6, wherein R1, R2, R3, R4, R5, and R6, are as follows:

| | | | | | | |
|---|---|---|---|---|---|---|
| $AK_2CO_3$ | + 2 HHA | → 2 AKHA(s) | + $H_2O$(g) | + $CO_2$(g) | R1 |
| $AKHCO_3$ | + HHA | → AKHA(s) | + $H_2O$(g) | + $CO_2$(g) | R2 |
| AKOH | + HHA | → AKHA(s) | + $H_2O$(g) | | R3 |
| $AECO_3$ | + 2 HHA | → $AEHA_2$(s) | + $H_2O$(g) | + $CO_2$(g) | R4 |
| $AE(OH)_2$ | + 2 HHA | → $AEHA_2$(s) | + $H_2O$(g) | | R5 |

$$(PbCO_3)_2Pb(OH)_2+6HHA \rightarrow 3PbHA_2(s)+2CO_2(g)+4H_2O(g) \quad R6$$

wherein AK represents an alkaline metal ion, AE represents an alkaline earth metal ion and HA represents a halogen ion.

6. A method of treating a halogen-containing waste material with a halogen reactive material selected from the group consisting of alkali and alkaline earth metal hydroxides, alkali and alkaline earth metal carbonates and mixtures thereof; said method comprising the steps of a) adding the halogen reactive material to the halogen containing waste material, the amount of added halogen reactive material being between 0.5 and 1 times the stoichiometrical amount of halogen atoms in the waste material, b) heating the waste material and halogen reactive material in a pressure reactor means essentially without addition of water at a temperature within the range between 150° and 750° C. that is sufficient to generate a pressure above 2 bars, said pressure reactor means comprising means for releasing volatile compounds liberated from the waste material so as to control pressure build-up in the reactor means, said reactor means being otherwise closed; and c) maintaining the pressure reactor means for a sufficient time to convert halogen in the waste material to alkali or alkaline earth metal halides, whereby substantially all halogen possible are reacted to alkali or alkaline earth metal halides.

7. A method of treating a halogen-containing waste material according to claim 6, further comprising adding water in step a), the amount of water added being sufficiently low so as not to affect the reaction in steps b) and c).

8. A method of treating a halogen-containing waste material according to claim 6, wherein the waste material is wet prior to the reaction between the waste material and the halogen reactive material.

9. A method of treating a halogen-containing waste material according to claim 6, wherein the halogen reactive material added in step a) is in the form of an aqueous slurry.

10. A method of treating a halogen-containing waste material according to claim 6, wherein the halogen containing waste material and the halogen reactive material are present in the reactor means in respective forms and amounts that cause them to undergo a reaction with one another that consists essentially of at least one reaction scheme selected from the group consisting of R1, R2, R3, R4, R5, and R6, wherein R1, R2, R3, R4, R5, and R6, are as follows:

| | | | | | |
|---|---|---|---|---|---|
| $AK_2CO_3$ | + 2 HHA | → 2 AKHA(s) | + $H_2O$(g) | + $CO_2$(g) | R1 |
| $AKHCO_3$ | + HHA | → AKHA(s) | + $H_2O$(g) | + $CO_2$(g) | R2 |
| AKOH | + HHA | → AKHA(s) | + $H_2O$(g) | | R3 |
| $AECO_3$ | + 2 HHA | → $AEHA_2$(s) | + $H_2O$(g) | + $CO_2$(g) | R4 |
| $AE(OH)_2$ | + 2 HHA | → $AEHA_2$(s) | + $H_2O$(g) | | R5 |

$$(PbCO_3)_2Pb(OH)_2+6HHA \rightarrow 3PbHA_2(s)+2CO_2(g)+4H_2O(g) \quad R6$$

wherein AK represents an alkaline metal ion, AE represents an alkaline earth metal ion and HA represents a halogen ion.

* * * * *